Patented July 6, 1926.

1,591,676

UNITED STATES PATENT OFFICE.

HUGO GALLINOWSKY, OF RICHMOND HEIGHTS, MISSOURI, ASSIGNOR TO THE GENERAL INSULATING AND MANUFACTURING COMPANY, OF ALEXANDRIA, INDIANA, A CORPORATION OF INDIANA.

REFRACTORY AND HEAT-INSULATING CEMENT.

No Drawing.   Application filed October 23, 1924.   Serial No. 745,524.

This invention relates to a cement particularly intended for use in setting heat insulating bricks or blocks, of a character described in a companion application, filed of even date herewith.

In preparing this cement, I calcine siliceous limestone (mineral wool rock) at a temperature approximating 1200° F., and then powder it. To this powdered calcined rock, I then add a composition composed of mineral wool, asbestos, mineral wool rock cement, and a gum prepared by dissolving mineral wool in dilute sulphuric acid.

The materials of this composition are added in the following proportions by weight:

Mineral wool, six pounds; asbestos, two pounds; mineral wool rock cement, one pound; mineral wool gum, one pound.

Mineral wool rock is a rock principally found in large quantities in northeast Indiana. There is no special name for the rock, it being usually referred to as siliceous limestone, but it might be classified as felspar, without sodium or potassium percentages. The analysis of mineral wool rock is approximately as follows:

|  | Per cent |
|---|---|
| Silica | 42.84 |
| Alumina and iron oxide | 1.40 |
| Calcium oxide | 51.74 |
| Magnesium oxide | 2.75 |
| Undetermined | 1.27 |
|  | 100 |

Mineral wool is a fibrous wool-like material resembling spun glass, which may be made by blowing a powerful jet of air or steam through melted slag. As used by me, it is prepared by melting siliceous limestone, or mineral wool rock, as above defined, and projecting a blast of air or steam through a stream of melted material.

Mineral wool rock cement, as this term is used in the specification, is a cement formed simply by calcining at a temperature approximating 1200° F. the mineral wool rock as above defined.

The substance referred to as mineral wool gum is prepared by dissolving mineral wool in approximately an eleven per cent solution of sulphuric acid, the mineral wool being added slowly, until all of the acid is neutralized. A gelatinous gummy substance which consists of colloidal silica and calcium sulphate results. This substance is used as a binder in my improved cement.

The materials of the composition as named above, being thoroughly mixed, equal portions of the composition and of the powdered calcined rock are thoroughly mixed together. The resulting material is then ready to be bagged and shipped.

For use as a mortar, water is added to the cement, to bring it to the desired consistency, and when the cement is placed between bricks and allowed to dry, it hardens, and in this condition is both refractory and heat insulating in character. It, therefore, provides an ideal cement for use in laying heat insulating bricks, as in lining furnaces, or the like.

While the mixture of the powdered calcined mineral wool rock and the composition of materials referred to above makes an ideal refractory and heat insulating cement, an excellent cement may be prepared by combining with the powdered mineral wool rock a suitable heat insulating ingredient alone, such as crushed mineral wool or suitably comminuted asbestos.

I claim:

1. A refractory and heat insulating cement, comprising a mixture of powdered calcined siliceous limestone (mineral wool rock) and a heat insulating medium.

2. A refractory and heat insulating cement, comprising a mixture of powdered calcined siliceous limestone (mineral wool rock) and mineral wool.

3. A refractory and heat insulating cement, comprising powdered calcined mineral wool rock mixed with a composition consisting of mineral wool, asbestos, calcined mineral wool rock, and a gum prepared by dissolving mineral wool in dilute sulphuric acid.

4. The herein described method of preparing a refractory and heat insulating cement, which consists in powdering calcined mineral wool rock, then preparing a composition consisting of mineral wool, asbestos, calcined mineral wool rock and a binding gum prepared by dissolving mineral wool in dilute sulphuric acid, and then combining and mixing the powdered calcined rock and said composition.

5. The herein described method of preparing a refractory and heat insulating cement, which consists in powdering calcined mineral wool rock, then preparing a composition consisting of mineral wool, asbestos, calcined mineral wool rock and a binding gum prepared by dissolving mineral wool in dilute sulphuric acid, and then combining and mixing the powdered calcined rock and said composition in equal proportions by weight.

In testimony whereof, I have hereunto set my hand.

HUGO GALLINOWSKY.